Dec. 11, 1951 R. W. HART 2,577,757

VERY HIGH-FREQUENCY RADIO RECEIVING SYSTEM

Filed May 15, 1946 2 SHEETS—SHEET 1

INVENTOR
ROBERT W. HART
BY M. A. Hayes
ATTORNEY

Dec. 11, 1951 R. W. HART 2,577,757

VERY HIGH-FREQUENCY RADIO RECEIVING SYSTEM

Filed May 15, 1946 2 SHEETS—SHEET 2

INVENTOR
ROBERT W. HART
BY M. C. Hayes
ATTORNEY

Patented Dec. 11, 1951 2,577,757

UNITED STATES PATENT OFFICE 2,577,757

VERY HIGH-FREQUENCY RADIO RECEIVING SYSTEM

Robert Winfield Hart, United States Navy, Lynn, Mass.

Application May 15, 1946, Serial No. 669,771

13 Claims. (Cl. 250—20)

(Granted under the act of March 3, 1883, as amended April 30, 1928; 370 O. G. 757)

This invention relates to radio receiving systems and more particularly to very high frequency radio receiving systems.

In the use of super-heterodyne radio receivers for the reception of electro-magnetic waves of very high frequencies, the receiver design is limited by the difficulties encountered in building a suitable amplifier to amplify, and suitable oscillator to beat with, the incoming signals. High frequency oscillators to cover a wide frequency range are not particularly stable as to frequency and there is a threshold of operation beyond which it is impractical to design a suitable oscillator for this purpose. The circuit herein described is designed to lower the frequency of the received signal before mixing to correct the above conditions and permit use of a beat oscillator tuned to a lower frequency.

The received signal is tuned in by means of a properly selective circuit to discriminate against unwanted signals and fed into a sensitive push-pull detector circuit. The output from the detector circuit is adapted to couple energy into a tank circuit resonant at one half the frequency of the received signal in such a manner that oscillations are maintained in the tank circuit at one half the frequency of the received signal and of an instantaneous magnitude substantially proportional to the instantaneous magnitude of the received signal. A modulated signal output is obtainable from the tank circuit at one half the frequency of the received signal which may then be introduced to the input circuit of a standard radio receiver designed to operate in this lower frequency range where the aforementioned difficulties do not exist. In the description of the operation of this embodiment of the invention both here and hereinafter, the signal frequency is referred to as being halved but this is intended to serve as an illustration and not to be considered as limiting in any way upon the invention.

The primary object of this invention is to generally improve radio receiving systems for the reception of very high radio frequency signals.

Another object of this invention is to provide a frequency divider capable of dividing the carrier frequency of modulated signal frequencies and maintain the modulation on the lower output frequency.

These and other objects will be apparent to those skilled in the art from the following description when taken with the accompanying drawings in which.

Figure 1:
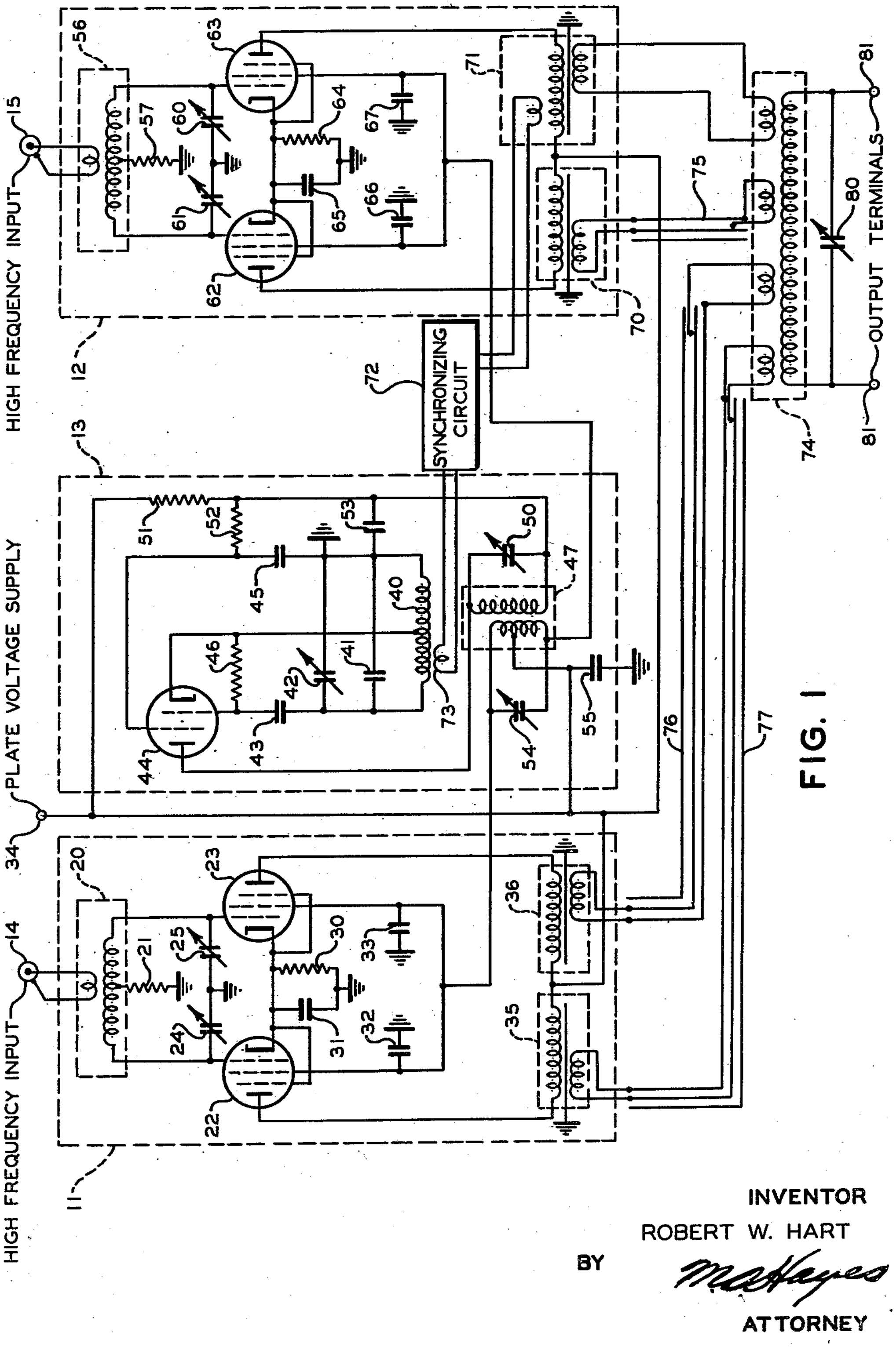
Fig. 1 is a schematic diagram of one embodiment of the invention.

Referring to the drawings and more particularly to Fig. 1, this embodiment of the invention is composed substantially of two similarly connected sensitive push-pull detectors indicated by blocks 11 and 12 and an electron-coupled Hartley oscillator indicated by block 13 used as a squelch oscillator. Terminals 14 and 15 are input terminals for antenna connections to either a single antenna or to two separate antennas. Referring to the push-pull detector circuit represented by block 11, terminal 14 is coupled to the primary winding of input radio frequency transformer 20. The midtap of the secondary winding of transformer 20 is connected to ground through resistor 21. One end of the secondary winding of transformer 20 is connected to the control grid of pentode electron tube 22 and the other end, to the control grid of pentode electron tube 23. Variable condensers 24 and 25 are connected in series between the ends of the secondary winding of transformer 20 permitting the tuned secondary circuit comprising the secondary winding of transformer 20 and condensers 24 and 25 to be tuned to the desired radio frequency. The cathodes and suppressor grids of pentodes 22 and 23 are connected together and to ground through the parallel combination of cathode bias resistor 30 and by-pass condenser 31. The screen grid of pentode 22 is connected to ground through by-pass condenser 32 and the screen grid of pentode 23 is similarly connected to ground through by-pass condenser 33 with the screen grids of pentodes 22 and 23 also connected together. The plate of pentode 22 is connected to the plate voltage supply at terminal 34 through the primary winding of transformer 35 and the plate of pentode 23, to terminal 34 through the primary winding of transformer 36. Transformers 35 and 36 are both provided with an electrostatic shield that is grounded.

The squelch oscillator circuit as represented by block 13 is a conventional electron coupled Hartley oscillator. The tank circuit of this oscillator is composed of the parallel combination of inductor 40, fixed condenser 41, and variable condenser 42. One end of inductor 40 is connected through grid bias condenser 43 to the control grid of tetrode electron tube 44 and the other end is connected to ground. The screen grid of tetrode 44 is connected to the plate voltage source at terminal 34 through decoupling resistors 51 and 52 in series, and is connected to the grounded end of inductor 40 through signal coupling condenser 45. The cathode of tetrode 44 is connected directly to a tap on inductor 40 and also through grid leak resistor 46 to the grid of tetrode 44. The plate of tetrode 44 is connected through the parallel tuned circuit consisting of the primary winding of transformer 47 and variable condenser 50 to the plate voltage supply at terminal 34 through decoupling resistor 51. Decoupling condenser 53 is connected between the plate side of resistor 51 and ground. The secondary winding of transformer 47 is tuned by variable condenser 54 connected across the ends of the winding. A midtap from this winding is connected to the plate voltage supply at terminal 34 and to ground through by-pass condenser 55. This produces at each end of the secondary winding, a sine wave at the oscillator frequency, in opposite phase, and each varying about an average voltage equal to the plate voltage supply at terminal 34. One end of this secondary winding of transformer 47 is connected to the screen grids of pentodes 22 and 23 and the other end is similarly connected to pentodes 62 and 63.

Sensitive push-pull detector represented by block 12 is connected similarly to the detector described for block 11 with the input being obtained from terminal 15 and applied to the primary winding of transformer 56. The secondary winding of transformer 56 has its mid-tap connected to ground through grid resistor 57, variable tuning condensers 60 and 61 connected in series between the ends of the winding, and one end of the winding connected to the control grid of pentodes 62, the other end of the control grid of tetrode 63. The cathodes and suppressor grids of pentodes 62 and 63 are connected together and then to ground through the parallel combination of cathode bias resistor 64 and by-pass condenser 65. The screen grid of pentode 62 is by-passed to ground through condenser 66 and the screen grid of pentode 63 is similarly by-passed by condenser 67. The screen grids of pentodes 62 and 63 are also connected together and to one end of the secondary winding of transformer 47 as previously mentioned. The plate of pentode 62 is connected to the plate voltage supply at terminal 34 through the primary winding of transformer 70 and the plate of pentode 63 is similarly connected through the primary winding of transformer 71, each transformer being equipped with a grounded electrostatic shield. Transformer 71 is also equipped with a coupling loop that may be connected as an input to synchronizing circuit 72 which feeds an output to coupling loop 73 to couple the signal output from circuit 72 to inductor 40. The synchronizing circuit 72 is so designed that the signal output thereof serves to maintain the oscillator 13 at the proper frequency and phase with respect to the incoming frequency at terminals 14 and 15 to obtain a division of frequency by the desired factor. The function of synchronizing circuit 72 is to perform automatically and electronically what otherwise would require the manual manipulation of variable capacitor 42 to accomplish.

Transformer 74 has four exciting or primary windings and a single excited or secondary winding. It is excited by having a first exciting winding connected directly to the secondary winding of transformer 71, a second exciting winding connected through variable delay line 75 to the secondary winding of transformer 70, a third exciting winding connected through variable delay line 76 to the secondary winding of transformer 36, and a fourth exciting winding connected through variable delay line 77 to the secondary winding of transformer 35. The secondary winding of transformer 74 is tuned by means of variable condenser 80 located in parallel with it. The output signal from the secondary winding of transformer 74 is made available at terminals 81 and may be applied to the input circuit of a standard radio receiver.

In the description of the operation of this embodiment of the invention, it will be assumed that terminals 14 and 15 are both connected to the same antenna so that the phase of the signal at each input will be the same. Variable condensers 24 and 25 and variable condensers 60 and 61 are used to tune the input circuits of detectors 11 and 12 to the frequency of the signal to be received. Oscillator 13 and its output circuit is at the same time tuned to one half the frequency of the received signals, the oscillator tuning being accomplished by variable condenser 42, and the primary and secondary of transformer 47 being tuned by variable condensers 50 and 54 respectively. Other adjustments to be made are: to adjust delay line 75 to produce a delay of three halves of a wavelength of the received frequency, to adjust delay line 76 to produce a delay of one wavelength of the received signal, to adjust delay line 77 to produce a delay of one half a wavelength of the received signal, and to tune the secondary of transformer 74 by means of variable condenser 80 to one half the frequency of the received signal. The values for the aforementioned tuning adjustments are for the optimum operating condition of this embodiment of the invention; but it is not to be inferred that values that are not exactly as described will make the circuit inoperative. The effect of adjustments that are not made precisely as mentioned above will merely result in a lower overall sensitivity of the receiving system as a whole.

Figure 2:
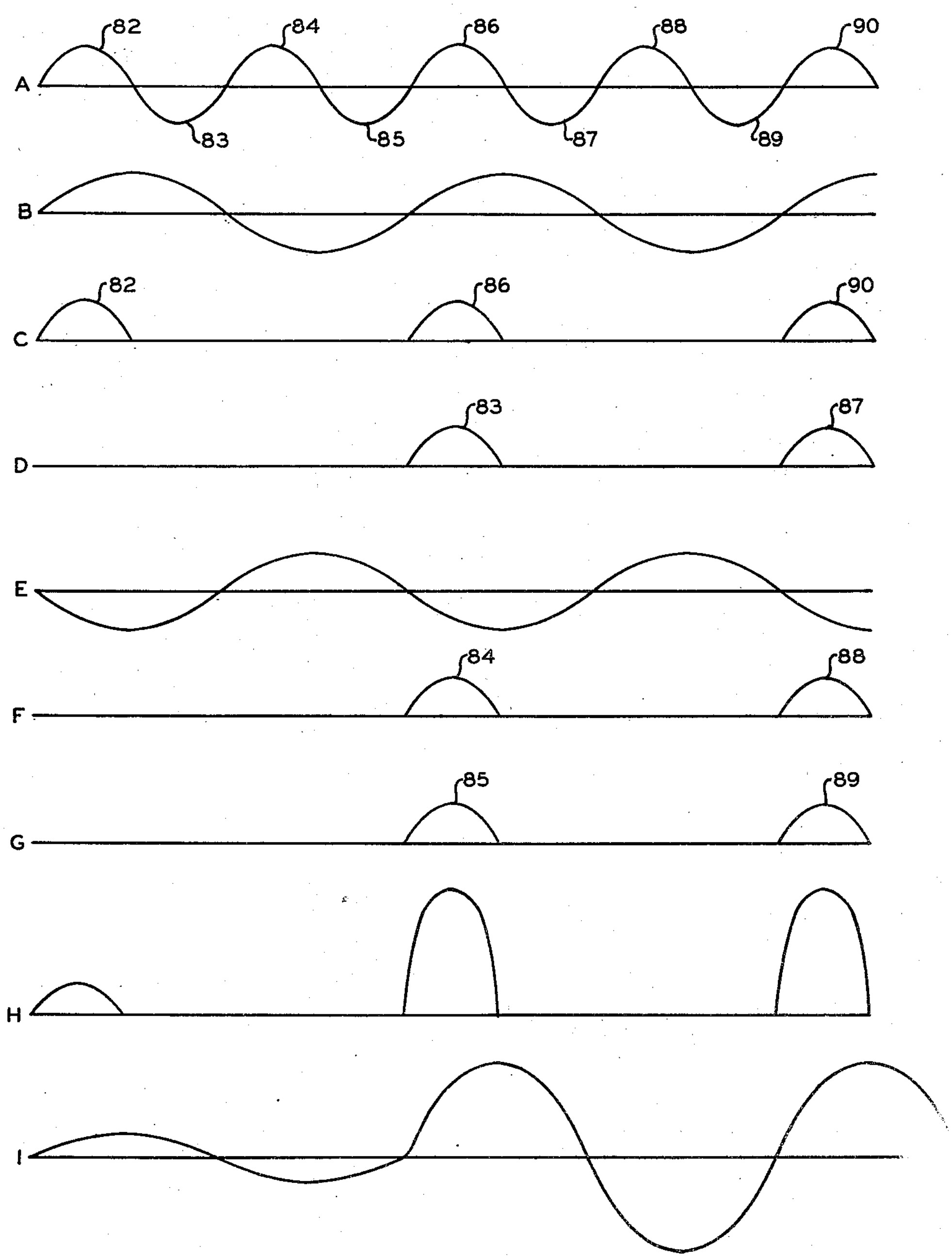
Fig. 2 is a series of voltage waveforms taken at various points in the circuit of Fig. 1.

With the above adjustments made for a received signal applied to terminals 14 and 15 as shown having half cycles as numbered from 82 to 90 in curve A of Fig. 2, the output of oscillator 13 to the screen grids of pentodes 62 and 63 will have the frequency and phase as shown in voltage waveform B of Fig. 2 due to the tuning of the elements of oscillator 13 and the synchronizing effect of synchronizing circuit 72. During the first half cycle of waveform B of Fig. 2, when the voltage applied to the screen grids of pentodes 62 and 63 is above its average voltage value; push-pull detector 12 operates normally, detecting signals appearing at input 15. During the second half cycle of waveform B of Fig. 2 with the voltage below its average value, the plates of pentodes 62 and 63 are cut off so that no output signals from detector 12 occur during this portion of the cycle of waveform B of Fig. 2. Similarly voltage waveform E of Fig. 2 which is 180 degrees out of phase with waveform B of Fig. 2, alternately disables and enables push-pull detector 11. As a result of this alternate enabling and disabling of the detectors, and the delays inserted by delay lines 75, 76, and 77; waveform C (Fig. 2) represents the output from transformer 71 to transformer 74; waveform D (Fig. 2) represents the delayed output from transformer 70 to transformer 74; waveform F (Fig. 2), the delayed output from transformer 36 to transformer 74; and waveform G (Fig. 2), the delayed output from transformer 35 to transformer 74. These outputs applied simultaneously to transformer 74 produce an exciting pulse which is substantially equivalent to waveform H of Fig. 2 which is an addition of waveforms C, D, F, and G of Fig. 2. The tuned secondary of transformer 74 as a result oscillates at the frequency to which it is tuned, namely, one half the frequency of the received signal in a manner as shown in waveform I of Fig. 2. The tuned circuit comprising the secondary winding of transformer 74 and condenser 80 is sufficiently damped so that the magnitude of the oscillations follows substantially the modulation of the received voltage waveform. The modulated oscillations occurring in the secondary winding of transformer 74 are made available at terminals 81 for input to a standard radio receiver for further detection.

In the foregoing description it was assumed that the inputs to detectors 11 and 12 at terminals 14 and 15 were from the same antenna or from two separate antennas located along the wave front of the received radio frequency signal. With terminals 14 and 15 being fed from separate antennas, the relative positions of which may be varied with respect to the wave front of the received radio frequency signal, the system may be used in directional reception and in high frequency direction finding as a result of shifts in time phase of the outputs of detectors 11 and 12 as the relative positions of the antennas are changed.

The invention described in the foregoing specification need not be limited to a frequency division of two, the use of two push-pull detectors, or other details shown; which are considered to be illustrative of one form the invention may take; but may be used for integral frequency division of any predetermined amount, or may be used with a greater or smaller number of push-pull detector circuits. The waveforms shown in Fig. 2 are intended to show neither absolute nor relative magnitudes but are included for clarifying the time relations of the waveforms at various points in the circuit of Fig. 1. The scope of the invention is defined by the appended claims.

The invention described herein may be manufactured and used by or for the Government of the United States of America for government purposes without the payment of any royalty thereon or therefor.

What is claimed is:

1. Electronic apparatus for dividing the frequency of radio frequency waves to obtain a divided frequency output comprising, a push-pull circuit having an input circuit tunable to the frequency of said radio frequency waves, means to obtain two output signals from said push-pull circuit, an oscillator tunable to said divided frequency, said oscillator being coupled to said push-pull circuit to enable and disable said push-pull circuit in synchronism with said divided frequency, an output circuit resonant at said divided frequency, and means for applying said output signals from said push-pull circuit to said output circuit said last-mentioned means including means for delaying one of said output signals an amount sufficient that it arrives at said output circuit in phase with the other of said two output signals.

2. Apparatus for the division of modulated high frequency oscillations while maintaining the modulation thereof on the lower frequency output, said apparatus comprising, first and second push-pull circuits each having an input circuit tunable to said high frequency oscillations, and oscillator being tunable to said lower frequency, the output of said oscillator being coupled to said first and second push-pull circuits, means in said push-pull circuits responsive to said oscillator output for alternately enabling and disabling said first and second push-pull circuits in synchronism with said lower frequency, an output circuit tuned to said lower frequency, and means including delay lines for coupling the output signals of said first and second push-pull circuits to arrive in phase at said output circuit, whereby said output circuit is maintained in oscillation at said lower frequency.

3. Apparatus for the division of modulated high frequency oscillations which maintains the modulation upon the lower output frequency, said apparatus comprising, first and second push-pull circuits each having an input circuit tunable to said high frequency oscillations, each of said push-pull circuits comprising first and second electron tubes connected in push-pull and each having a screen grid, an oscillator tunable to said lower frequency, the output of said oscillator being impressed on said screen grids of said first and second tubes of said first push-pull circuit and in opposite phase to said screen grids of said first and second tubes of said second push-pull circuit for alternately and synchronously enabling and disabling said first and second push-pull circuits, an output circuit tuned to said lower frequency, means including delay lines for coupling the outputs of said first and second push-pull circuits to arrive simultaneously at said output circuit, thereby to shock said output circuit into oscillation at said lower frequency.

4. Apparatus for the division of high frequency oscillations to obtain a lower output frequency, said apparatus comprising, four electron tubes each having at least a control grid, a screen grid and an anode, a first and second of said tubes being connected in push-pull to form a first push-pull circuit and the third and fourth of said tubes being connected in push-pull to form a second push-pull circuit, each of said push-pull circuits having an input circuit tunable to said high frequency, said input circuits being similarly coupled to said first and second push-pull circuits in such a manner that the high frequency oscillations appear on the control grids of said first and third tubes in one phase and in opposite phase on the control grids of said second and fourth tubes, an oscillator circuit tunable to said lower frequency, the output of said oscillator being impressed on said screen grids of said first and second tubes in one phase and in opposite phase on said screen grids of said third and fourth tubes for alternately and synchronously enabling and disabling said first and second push-pull circuits, an output circuit resonant at said lower frequency, means directly coupling the output of said first tube to said output circuit, and delay lines coupling the outputs of said second, third and fourth tubes to said output circuit, said delay lines being of such electrical length that the outputs from said four tubes are applied simultaneously to said output circuit, whereby said output circuit is maintained in oscillation at said lower frequency.

5. Apparatus for the division of modulated high frequency oscillations which maintains the modulation upon the lower output frequency, said apparatus comprising, first and second push-pull circuits each adapted to produce two output signals, an oscillator tunable to said lower frequency, means coupling the output of said oscillator to said first and second detector circuits in phase opposition for alternately enabling and disabling said push-pull circuits in synchronism with said lower frequency, an output circuit tunable to said lower frequency, means directly coupling one of the outputs of said first push-pull circuit to said output circuit, and delay lines coupling the other output of said first push-pull circuit and the two outputs of said second push-pull circuit to said output circuit, said delay lines being of such electrical length that all four outputs of said detectors are applied simultaneously to said output circuit, whereby said output circuit is maintained in oscillation at said lower frequency.

6. Apparatus for the division of modulated high frequency oscillations which maintains the modulation upon the lower output frequency, said apparatus comprising, first and second push-pull circuits, each having an input circuit tunable to said high frequency oscillations, each of said push-pull circuits comprising first and second electron tubes connected in push-pull and each having a screen grid, means connected to each of said electron tubes to produce an output signal, an oscillator tunable to said lower frequency, means coupling the output of said oscillator to the screen grids of said first and second tubes of said first detector and in opposite phase to the screen grids of said first and second tubes of said second detector for alternately enabling and disabling said first and second push-pull circuits in synchronism at said lower frequency, an output circuit tunable to said lower frequency, means directly coupling the output signal of said first electron tube of said first push-pull circuit to said output circuit, and delay lines coupling the outputs of said second tube of said first push-pull circuit and of said first and second tubes of said second push-pull circuit to said output circuit, said delay lines being of such electrical length that the output signals from all the tubes comprising said first and second push-pull circuits are applied in phase to said output circuit, whereby said output circuit is shocked into oscillation at said lower frequency.

7. Apparatus for the division of high frequency oscillations to obtain a lower output frequency comprising, a source of high frequency oscillations, first, second, third and fourth electron tubes each having at least a cathode, an anode, a control grid, and a screen grid, said first and second tubes being connected to form a first push-pull circuit, and said third and fourth tubes being connected to form a second push-pull circuit, first and second input circuits respectively coupling said source of high frequency oscillations to said first and second push-pull circuits for impressing said high frequency oscillations on the control grids of said first and third tubes in one phase and on the control grids of said second and fourth tubes in opposite phase, an oscillator tunable to said lower output frequency, means coupling said oscillator to said first and second push-pull circuits for impressing the output of said oscillator on the screen grids of said first and second tubes in one phase and in opposite phase on the screen grids of said third and fourth electron tubes whereby anode current alternately flows in the output circuits of said first, second, third and fourth tubes, a resonant circuit tunable to said lower output frequency, means coupling the output circuit of said first electron tube directly to said resonant circuit, and delay line means coupling the output circuits of said second, third and fourth tubes to said resonant circuit, said delay lines being of such electrical length that the output of all four of said tubes are applied simultaneously to said resonant circuit whereby said resonant circuit is maintained in oscillation at said lower output frequency.

8. Apparatus for dividing the frequency of a modulated carrier wave while maintaining the modulation thereof on the lower frequency output, said apparatus comprising, first and second push-pull circuits each having an input circuit tunable to said carrier wave, means for applying to said push-pull circuits an alternating voltage at said lower frequency for alternately enabling and disabling said push-pull circuits in synchronism with said lower frequency, an output circuit tuned to said lower frequency, and delay line means coupling the output signals of said first and second push-pull circuits to said output circuit, said delay line means being of such electrical length that said output signals arrive in phase at said output circuit.

9. Apparatus for dividing the frequency of a modulated carrier signal while maintaining the modulation thereof on the lower frequency output, said apparatus comprising, a push-pull circuit having an input circuit tunable to said carrier signal frequency and two output circuits, means for applying to said push-pull circuit an alternating voltage signal for alternately enabling and disabling said push-pull circuit in synchronism with said lower frequency, an output circuit tuned to said lower frequency, and means for coupling the output circuits of said push-pull circuit to said output circuit, said means including a delay line of such electrical length that the output signals from said two output circuits arrive in phase at said output circuit.

10. Apparatus for dividing the frequency of radio frequency waves to obtain a divided frequency output comprising, first and second push-pull circuits each having an input circuit tunable to the frequency of said radio frequency waves, means for applying to said push-pull circuits a voltage signal at said divided frequency for alternately enabling and disabling said push-pull circuits in synchronism with said divided frequency, an output circuit tuned to said divided frequency, and means coupling the output signals of said first and second push-pull circuits to said output circuit, said coupling means including means for delaying selected ones of said output signals an amount whereby all of said output signals arrive in phase at said output circuit.

11. Apparatus for dividing the frequency of a modulated carrier signal while maintaining the modulation thereof on the lower frequency output, said apparatus comprising, first and second push-pull circuits each arranged to produce two output signals, means for applying an alternating voltage signal to said first and second push-pull circuits in phase opposition for alternately enabling and disabling said push-pull circuits in synchronism at said lower frequency, an output circuit tunable to said lower frequency, means directly coupling one of the output signals of said first push-pull circuit to said output circuit, and means including a plurality of delay lines for coupling the other output signal of said first push-pull circuit and the two output signals of said second push-pull circuit to said output circuit.

12. Apparatus for dividing the frequency of a radio frequency wave to obtain a lower frequency output signal comprising, a tuned output circuit resonant at said lower frequency, means for generating a control signal having said lower frequency, a plurality of rectifying circuits operative in response to said control signal for producing positive half-wave components of said radio frequency wave, and means for applying said half-wave components to said output circuit, said last-mentioned means including a plurality of delay lines each being of such electrical length that the half-wave components from all of said rectifying circuits arrive in phase at said output circuit.

13. Apparatus for dividing the frequency of a carrier signal to obtain a lower frequency output signal comprising, a tuned output circuit resonant at said lower frequency, a plurality of rectifying circuits, means for applying said carrier signal to said plurality of rectifying circuits, means for generating an alternating voltage signal at said lower frequency, means for applying said alternating voltage signal to said rectifying circuits for alternately enabling and disabling said circuits in synchronism with said alternating signal to obtain half-wave components of said carrier wave from each of said rectifying circuits, and means for applying said half-wave components to said output circuit, said last-mentioned means including a plurality of delay lines of such electrical lengths that the half-wave components from each of said rectifying circuits arrive in phase at said output circuit.

ROBERT WINFIELD HART.

REFERENCES CITED

The following references are of record in the file of this patent:

UNITED STATES PATENTS

| Number | Name | Date |
|---|---|---|
| 1,926,875 | Llewellyn | Sept. 12, 1933 |
| 2,212,182 | Paddle | Aug. 20, 1940 |
| 2,252,442 | Schlesinger | Aug. 12, 1941 |
| 2,262,764 | Hull | Nov. 18, 1941 |
| 2,277,000 | Bingley | Mar. 17, 1942 |
| 2,351,193 | Crosby | June 13, 1944 |
| 2,352,634 | Hull | July 4, 1944 |